Sept. 6, 1960  D. T. N. WILLIAMSON ET AL  2,951,344
SERVO-CONTROLLED DRIVES
Filed July 13, 1959  2 Sheets-Sheet 1

Inventors
David T. N. Williamson
Donald F. Walker
By
Cameron, Kerkam & Sutton
Attorneys

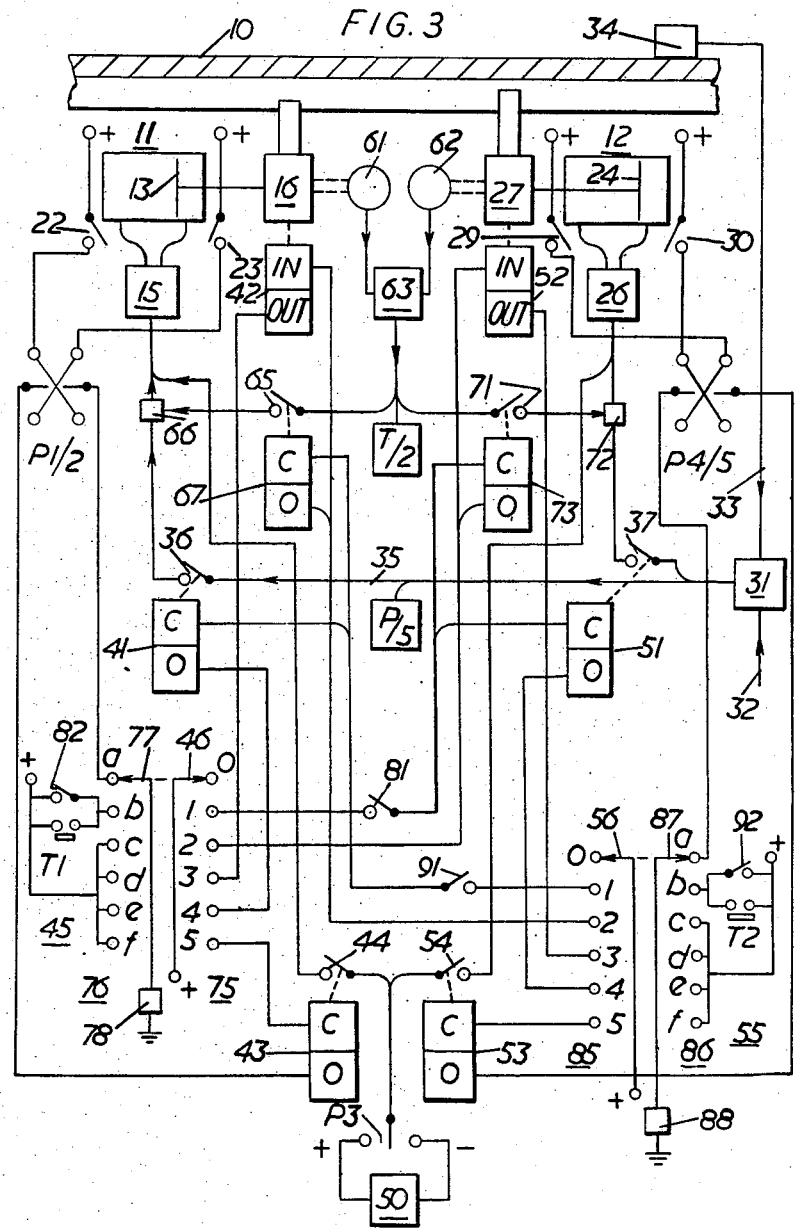

United States Patent Office 2,951,344
Patented Sept. 6, 1960

2,951,344
SERVO-CONTROLLED DRIVES

David Theodore Nelson Williamson, Priorwood, Polton, Midlothian, and Donald Ferguson Walker, Barnton, Midlothian, Scotland, assignors to Ferranti, Limited, Hollinwood, Lancashire, England, a company of Great Britain Filed July 13, 1959, Ser. No. 826,745

Claims priority, application Great Britain July 14, 1958

8 Claims. (Cl. 60—97)

This invention relates to servo-controlled drives for imparting to an object a movement with respect to a reference structure in dependence on a servo control signal. The invention has particular application to machine tools and will be described in that connection. It should however be understood that the invention is in no way restricted to machine tools but is suitable for any application where an object has to be moved with respect to a reference structure in dependence on a servo control signal.

In machine tool applications the object may be the work table of the machine and the reference structure the fixed framework, the drive to the work table being under the control of the servo signal. It will be assumed that the required movement of the table is a straight-line movement; but the invention is also applicable to other forms of machine-tool movement, such as rotational movement.

It is well known to effect such a drive by means of an actuator in the form of an electric motor operating to rotate a feedscrew to propel the table under the control of the signal. Such a system has the disadvantage of being somewhat slow in response to changes in the signal, or, if designed for a rapid response, of requiring expensive amplifier equipment. These defects become more marked as the power of the drive is increased.

It is also known to effect such a drive by means of a hydraulic actuator of the type including a piston arranged to traverse a cylinder under the control of the signal, such control operating by means of relative adjustments of the liquid pressures on the respective faces of the piston. The response is potentially very much more rapid than that of the inexpensive electric drive of the kind described but where a considerable movement of the work table is required the arrangement is unwieldy and the speed of response is reduced owing to the elastic deformation of the necessarily long column of liquid unless expensive mechanical transmission systems are employed.

An object of the present invention is to provide a drive for the purpose stated capable of accurately effecting long movements of the object with a rapid response to changes of the control signal and without requiring expensive amplifying or transmission equipment.

A further object is to provide such a drive which combines the advantages of the short-range hydraulic-ram or piston-and-cylinder type of actuator with a comparatively long range of overall movement.

In accordance with the present invention a servo-controlled drive for imparting to an object a movement relative to a reference structure in dependence on a control signal representing at any given moment the required position, velocity, or acceleration of the object relative to the structure at that moment includes at least two actuators each having a piston arranged to traverse a cylinder which is short compared with the range of said movement, for each actuator a clutch for coupling the actuator to drive the object relative to the reference structure, actuator changeover means for bringing the actuators sequentially into sole driving engagement with the object, a measuring device for deriving a measured signal representing at any given moment the actual position, velocity, or acceleration of the object relative to the reference structure at that moment, a comparator for comparing said measured signal with said control signal and deriving an error signal dependent in sense on the sense of the difference between those signals, and actuator control means whereby the position in its cylinder of the piston of the active actuator—that is, the actuator in said driving engagement—is dependent on said error signal.

Said actuator changeover means may include for each actuator two actuator switches arranged to be respectively operated as the piston of that actuator nears the respective ends of its travel and a relay system controllable by said switches to effect the appropriate operation of the clutches and the application of the error signal.

Said relay system may include for each actuator a stepping switch including a wiper arranged to traverse a bank of fixed contacts when the piston of the actuator closes the actuator switch near the end of its active travel, relays connected to those contacts so as to be energised by the engagement of the wiper therewith to successively apply the error signal to the on-coming actuator—that is, the next actuator to be rendered active—engage the clutch of the on-coming actuator, thereby rendering that actuator active, disengage the clutch of the off-going actuator, thereby rendering that actuator idle, disconnect the error signal from the idle actuator, and finally transfer the piston of the idle actuator to the other end of its travel.

In the accompanying drawings,

Figure 3 is a simplified schematic diagram of a modified form of the embodiment of Figure 1.

Figure 1:
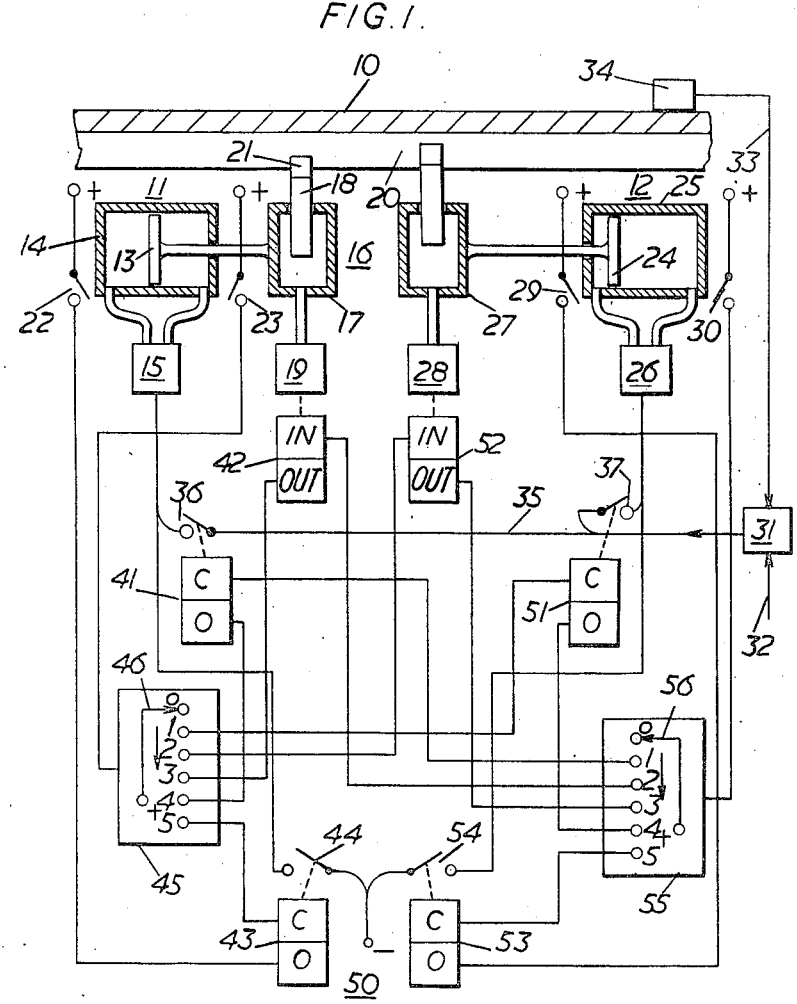
Figure 1 is a simplified schematic diagram of one embodiment of the invention.
Figure 2:
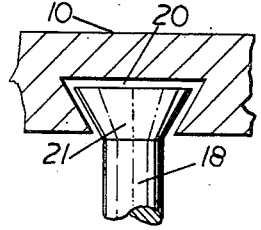
Figure 2 is a sectional view to an enlarged scale of a part of the apparatus of Figure 1.

In carrying out the invention in accordance with one form by way of example, see Figures 1 and 2, a servo-controlled drive for moving the work table 10 of a machine tool from left to right (as viewed in the drawing) in the direction of the plane of the paper at a velocity dependent on a servo control signal from a computer includes two short-range actuators 11 and 12 secured to the framework of the tool.

Actuator 11 includes a piston 13 arranged to traverse a cylinder 14 under the control of a fluid-flow valve 15 which itself is controlled electrically in a manner to be described. The valve is such that when the controlling signal is of one sense—positive, say—the piston is driven to the right, and when the signal is of the opposite sense (negative) the piston is driven to the left.

Piston 13 is coupled to the table 10 by way of a clutch 16 consisting of a cylinder 17, connected rigidly to piston 13 so that the axes of cylinders 14 and 17 are at right angles, and a plunger 18 the position of which is determined by another electrically controlled fluid-flow valve 19. The free end of plunger 18 lies within a longitudinal slot 20; this is shown in enlarged section in Fig. 2, the direction of movement of table 10 being here normal to the plane of the paper. The slot is of dovetail shape and plunger 18 ends in a member 21 of complementary shape, that is, the shape of a truncated wedge. Clearly, a downward movement of plunger 18 under the control of valve 19 causes member 21 to engage the slot frictionally, and so couple the actuator to drive the table relative to the framework, whereas an upward movement disengages member 21, and hence the actuator, from the work table.

Also associated with actuator 11 is an electric switch 22 arranged to be closed as the piston 13 nears the left-hand (LH) end of its travel (as viewed in the Fig. 1) and another switch 23 arranged to be closed as the piston nears the right-hand (RH) end of its travel.

Like equipment is provided for actuator 12—namely, a piston 24 in a cylinder 25 controlled by an electrically operated fluid-flow valve 26, a clutch 27 controlled by another fluid-flow valve 28 and arranged to engage or disengage piston 24 from slot 20, and actuator switches 29 (LH) and 30 (RH).

The error signal is derived by a comparator 31. This receives a servo control signal delivered over a channel 32 from a computer to represent at any given moment the required velocity of the work table with respect to the frame at that moment, and a signal delivered over a channel 33 and representing the actual velocity of the work table at that moment, the error signal being derived from a comparison of these signals. The signals representing the actual velocity of the table may conveniently be derived from a measuring device 34 of the tachometer kind actuated by the table. The error signal, delivered over a channel 35, is arranged to be applied to valve 15 by way of a gate or other switching device conveniently represented by a switch 36, and to valve 26 by way of a like device or switch 37. Each combination of switch 36 and valve 15, or switch 37 and valve 26, constitutes actuator control means whereby the active actuator is controlled by the error signal.

Switch 36 forms part of a bi-stable relay 41 having oppositely-wound windings indicated by "C" (Close) and "O" (Open) by which switch 36 is triggered to its closed and open stable conditions respectively. Thus when the C winding is momentarily energised the relay is triggered to close switch 36 (if not already closed). The switch remains closed until the O winding is momentarily energised to open it, and then remains open until the C winding is again energised, and so on.

A similar kind of bi-stable relay 42 is used to control the valve 19 of clutch 16. The oppositely-wound windings, here labelled In and Out, when momentarily energised cause the clutch to be operated to the engaged and disengaged conditions respectively, the clutch remaining in that condition until the other winding is momentarily energised.

A third relay 43, also similar to relay 41, controls a switch 44 connected between a source of negative potential 50 and valve 15.

Also provided is a rotary stepping switch 45 having a wiper 46 connected to a source of positive potential and arranged to traverse six contacts 0 to 5, which for convenience are depicted in plan projection. Details of a suitable switch will be given later.

Similar components 51 to 56, corresponding to components 41 to 46 respectively, are provided for actuator 12 and its clutch 27.

Actuator switch 23 is connected between the positive source and switch 45 so that the closing of switch 23 initiates a traverse by wiper 46 of its six contacts, from contact 0, which it normally engages, to contact 5 and thence back to contact 0 direct. Each of contacts 1 to 5 of switch 45 is connected to earth by way of a winding of one of the relays. In detail: contact 1 to the C winding of relay 51; contact 2 to the In winding of relay 52; contact 3 to the Out winding of relay 42; contact 4 to the O winding of relay 41, and contact 5 to the C winding of relay 43. Actuator switch 22 is connected between the positive source and the O winding of relay 43. In each case the connection to earth from the winding is omitted from the drawing for clarity.

Similar connections are made for actuator switches 29 and 30 and for stepping switch 55 of the other actuator.

*Operation, Fig. 1*

The operation will be described on the assumption that the requirement is for the table to be driven to the right at a steady velocity in response to an appropriate control signal applied over channel 32.

It is also assumed that to begin with the active actuator—that is, the actuator in driving engagement with the work table—is actuator 11, its clutch 16 being maintained by valve 19 (under control of relay 42) in its In or engaged condition coupling the actuator to the table, and valve 15 being maintained by an error signal of positive sense (applied to it through closed switch 36) so operated as to cause piston 13 to be driven to the right at the required velocity, this movement being imparted to the table by clutch 16.

In the meantime clutch 27 is disengaged and actuator 12 is idle with switch 37 open, thereby disconnecting the error signal from valve 26, and with piston 24 at the LH end of its travel.

In stepping switches 45 and 55 the wipers are at rest engaging the 0 contacts.

Only switches 29 and 36 are closed. Switch 36 is closed because relay 41 is in its closed stable condition. Switch 29 is closed because the idle piston 24 is at that end of its travel; because this switch is closed, the O winding of relay 53 is energized (which has no effect but to confirm the existing open condition of switch 54). None of the other relay windings are energised.

These conditions obtain until piston 13 is near enough to the RH end of its travel to close switch 23, thereby operating switch 45 to cause its wiper 46 to energise each of its contacts 1 to 5 monentarily in turn and so setting in train the following sequence of operations in the order named:

(1) Through contact 1, the C winding of relay 51 is energised to close switch 37; the error signal is thus applied to valve 26 to drive piston 24 of the on-coming actuator 12 to the right at the required velocity.

(2) Through contact 2, the In winding of relay 52 is energised, thereby engaging clutch 27 to couple piston 24 to the table; both actuators are now active. It is assumed that by the time clutch 27 has become thus engaged, piston 24 has acquired the full velocity demanded by the error signal; this assumption will be reconsidered later.

(3) Through contact 3 and the Out winding of relay 42, clutch 16 becomes disengaged, thereby de-coupling piston 13 of the off-going actuator 11 from the table.

(4) Through contact 4 and the O winding of relay 41, switch 36 is opened to disconnect the error signal from valve 15.

The result of these four operations is to transfer the drive from actuator 11 to actuator 12, which is now in sole driving engagement with the table, and render actuator 11 idle. One further operation is however still required to prepare for the next changeover of the actuators: the transfer of the idle piston 13 to the other (the LH) end of its travel ready to effect the next RH movement of the table. This transfer is effected by:

(5) Through contact 5, the C winding of relay 43 is energised to close contacts 44 and so apply the negative reversing potential of source 50 to valve 15 to cause the LH movement of piston 13; and (6) The closing of switch 22 by piston 13 at the end of this movement energises the O winding of relay 43 to open switch 44.

From contact 5, as already indicated, wiper 46 returns direct to its rest position at contact 0.

Actuator 12 remains active until piston 24 nears the RH end of its travel sufficiently for switch 30 to be closed. This in turn actuates stepping switch 55 to cause the relay system to change the actuators in use, rendering actuator 11 again active and actuator 12 again idle in a precisely similar manner to the changeover first described. The change correspondingly ends with the transference of piston 24 of the now idle actuator 12 from RH to the LH end of its travel ready for its next active movement.

The actuators continue to be brought into action alternately, driving the table steadily to the right at the speed determined by the servo control signal, for as long as is required. The fact that the drive, despite its considerable length, is being effected throughout by short-range actuators gives the advantages of precision operation, extremely rapid response, and negligible backlash, which have hitherto only been associated with short-range overall movement of the work table or elaborate and costly equipment.

It will be appreciated from the above description that throughout the RH movement of the table the four actuator switches perform two different functions: the two RH switches 23 and 30 act in turn only to set in train the changeover sequence of operation up to and including the start of the transference of the newly-idle piston to the LH end of its travel, whereas the two LH switches 22 and 29 act in turn only to arrest the idle piston when it reached the LH end.

If on the other hand the movement of the table is required to be to the left, the functions of each of these switches would be reversed. In order, therefore, that the table may be driven in either direction it is necessary to connect the two actuator switches of each actuator to the relay system by way of a changeover switch to allow of such reversal of function. Where the error signal is liable to changes of sense in the course of operation such changeover arrangements must be automatic.

Further elaboration of the system is usually required in order to ensure that the piston of the on-coming actuator has attained the velocity demanded by the error signal, which is the then velocity of the piston of the off-going actuator, before its clutch is engaged.

For this purpose delay means are provided in the form of means for deriving a velocity-error signal proportional to the velocity of the two pistons relative to one another and means for applying this signal to arrest further stepping movement of the wiper from contact 1 until the piston velocities are the same and as a result the velocity-error signal is zero. Such an arrangement will now be described with reference to Fig. 3, in which the components already described with reference to Fig. 1 are given their previous reference numbers. The figure also shows the automatic reversing arrangements, above referred to, which are needed where the error signal is liable to changes of sense during operation, and depicts a suitable form of stepping switch for components 45 and 55.

To effect the automatic changeover there is provided a relay P/5 connected to channel 35 to receive the error signal and arranged to control five sets of single-pole changeover contacts P1 to P5 so as to operate them to one or other of their two positions according as the error signal is positive or negative. Contacts P1 and P2 form a double-pole changeover switch, designated P1/2, connected in the leads from actuator switches 22 and 23 to switch 45 and relay 43 so that when the error signal is of one sense—positive, say—switch 23 is connected to switch 45 whereas switch 22 is connected to relay 43— the conditions appropriate to a drive of the work table from left to right, as already described—and when the error signal has the other sense these connections are reversed. Contacts P3 connect switches 44 and 54 to the source 50 of reversing potential, which now supplies potentials of both senses, so that the polarity of this source as applied by those switches to their respective valves 15 and 26 for restoring the idle piston to the other end of its stroke is always of sense appropriate to that purpose—that is, is always of opposite sense to the error signal. In this case the sense is negative for a left-to-right drive of the work table and positive for a reverse drive.

The delay means above referred to includes generators 61 and 62 of the tachometer kind coupled to the clutches or piston rods of actuators 11 and 12 respectively and each designed to produce a direct-current (D.C.) output of magnitude and sense dependent on the velocity of the piston it is coupled to and on the direction of that piston's movement. The outputs from the two generators are compared in a comparator 63 which produces a velocity-error signal in the form of a D.C. output of magnitude and sense dependent on the magnitude and sense of the difference between the outputs of the two generators. This signal is applied by way of a switch 65 to valve 15, the junction between this connection to the valve and that from switch 36 being by way of a diode or other device 66 to prevent unwanted interaction when signals are being applied to valve 15 over both these connections simultaneously in the manner to be described. Switch 65 is controlled by a relay 67 similar to relay 41, the C and O windings of relay 67 being connected in parallel with the C winding of relay 41 and the In winding of relay 42 respectively.

The velocity-error signal from comparator 63 is similarly applied by a switch 71 and device 72 to valve 26, a relay 73 controlling this switch and being similarly connected to relays 51 and 52 of actuator 12.

The means for applying the velocity-error signal to arrest further stepping movement of the wiper associated with the off-going actuator includes a relay T/2 to which that signal is applied and which is arranged to close contacts T1 and T2 (associated with the respective stepping switches) when and only when the velocity-error signal is zero as a result of the pistons having the same velocity.

Stepping switch 45 is again depicted schematically with its circular array of contacts in plan projection. It consists of two banks 75 and 76 each traversed by a wiper. Bank 75 contains the six contacts 0 to 5 traversed by positively-energised wiper 46 as described with reference to Fig. 1. Bank 76 contains six contacts $a$ to $f$ traversed by another wiper 77 so as to supply the necessary drive for wiper 46. For this reason wipers 46 and 77 are ganged—but not electrically connected—together, so that when wiper 77 engages contact $a$, wiper 46 engages contact 0, when wiper 77 engages contact $b$, wiper 46 engages contact 1, and so on, the two wipers traversing their respective contacts in the direction of the arrow, and returning from contacts $f$ and 5 to contacts $a$ and 0 direct respectively. Wiper 77 is connected to earth by way of the usual stepping mechanism, depicted generally at 78, which when the wiper engages an energised one of contacts $a$ to $f$ causes the wiper to be stepped to the next contact. The drive thus imparted by the mechanism to wiper 77 is in turn imparted by that wiper to wiper 46 through the ganged coupling between them.

In the lead from contact 1 of switch 45 to relays 51 and 73 is inserted a switch 81 so controlled from clutch 27 as to be closed when this clutch is disengaged but open when the clutch is engaged.

Of the contacts of bank 76, contact $a$ is connected to that moving contact of changeover switch P1/2 which connects actuator switch 23 to contact $a$ when the drive is left-to-right. Contact $b$ is connected to the positive source by way of a switch 82 so controlled from clutch 27 as to be closed when this clutch is engaged but open when the clutch is disengaged. In shunt with switch 82 are the contacts T1 of relay T/2. Contacts $c$ to $f$ are all connected to the positive source.

Stepping switch 55 is similarly arranged, with components 85 to 88 corresponding to 75 to 78 and switches 91 and 92 corresponding to switches 81 and 82. In shunt with switch 92 are the contacts T2 of relay T/2.

*Operation, Fig. 3*

The operation will be described on the assumption again that to begin with the table is being driven from left to right by an error signal of positive polarity with actuator 11 active, actuator 12 being idle with its piston 24 at the LH end of its travel. The respective conditions of the additional switches and relays are as follows:

Switch P1/2: connecting switches 23 and 22 to switch 45 and relay 43 respectively. Switch P4/5: connecting switches 30 and 29 to switch 55 and relay 53 respectively. Contacts P3: connecting switches 44 and 54 to the negative pole of source 50. Clutch-controlled switches 81 closed, 82 open, 91 open, 92 closed. Contacts T1 and T2 open, since the piston speeds are unequal. Contacts 65 and 71 open.

These conditions obtain until piston 13 reaches the RH end of its travel near enough to close contacts 23. The resulting energisation of contact $a$ causes wiper 77 to be stepped to contact $b$, carrying with it wiper 46 from contact 0 to contact 1. As switch 81 is closed (since clutch 27 is disengaged) the potential of wiper 46 is applied to effect operation (1) above described—namely, to energise winding C of relay 51 so as to close contacts 37 and apply the error signal to the on-coming actuator 12. As the C winding of relay 73 is now in parallel with that of relay 51, this operation also includes the closing of switch 71, the effect of which is to boost the main error signal by the application to it of the velocity-error signal derived from comparator 63. This boost accordingly imparts to the piston of the on-coming actuator an acceleration proportional to the extent to which the velocity of that piston is below that of the piston of the off-going actuator and so shortens the delay time which elapses before equality is reached.

When first engaged by wiper 77, contact $b$ is unenergised, for switch 82 is open (since clutch 27 is disengaged) and contacts T1 are open because as yet the piston velocities are unequal. The further stepping movement of wiper 46 is therefore arrested, the wiper remaining at contact 1 whilst piston 24 of the on-coming actuator gathers speed (the velocity-error signal backing off as it does so) until its velocity is equal to that of piston 13. The attainment of the required velocity brings the velocity-error signal down to zero and so causes relay T/2 to close its contacts. Of these, contacts T1 in closing apply the positive source to contact $b$ and so cause the wipers to be stepped to contacts C and 2 respectively. As the rest of the bank 76 contacts are all energised the two wipers step through their contacts sequentially, finally returning to their normal rest positions at contacts $a$ and 0.

As it engages each of contacts 2 to 5, wiper 46 effects operations (2) to (5) in turn, and switch 22 effects operation (6), as before. Operation (2) now includes (in addition to causing the engagement of clutch 27) the opening of contacts 71 to disconnect the velocity-error signal from the on-coming actuator. This operation is necessary because although the velocity-error signal is zero at the moment it will attain a considerable value when actuator 11 becomes idle and so would interfere with the operation of the active actuator if still applied to it. Thus the velocity-error signal is only applied to an actuator whilst its piston is being accelerated to take up the drive, the signal being disconnected the moment that the actuator becomes active.

At operation (5), the negative potential of the reversing source is of the polarity for returning the idle piston 13 to the left, until the piston closes switch 22, which owing to the condition of changeover switch P1/2 causes contacts 44 to open.

The operation is similar when actuator 12 reaches the end of its RH active travel and closes switch 30 to initiate the stepping action of stepping switch 55; wiper 56 of this switch waits at contact 1 until relay T/2 has closed contacts T2 as the result of piston 13 of the now on-coming actuator 11 having attained the required velocity.

Suppose now that whilst actuator 12 is driving the table steadily to the right, with piston 13 of idle actuator 11 at the LH end of its travel ready to continue that drive at the next change, the error signal changes sign from positive to negative, demanding an LH movement of the table. Three changes are required: (1) reversal of the direction of movement of the active piston 24; (2) transference of idle piston 13 to the RH end of its travel, since an LH drive will now be required at the next change; (3) operation of double-pole changeover switches P1/2 and P4/5 to reverse the respective functions of the actuator switches for the reason already given.

Change (1) is automatically effected by the reaction of valve 26 to the change of sign of the error signal.

Changes (2) and (3) are effected by relay P/5, which in response to the change of sign of the error signal reverses all its contacts P1 to P5. As actuator switch 22 is in its closed condition, since piston 13 is at that end of its travel, the reversal of switch P1/2 causes contact $a$ to be energised through switch 22 and so initiates a stepping operation of switch 45. Though contacts T1 are open, contacts 82 are closed (since clutch 27 is engaged) with the result that contact $b$ is energised and wiper 46 traverses all its contacts, without any pause at contact 1.

The resulting energisation of contact 1 has no effect, since switch 81 is open owing to clutch 27 being engaged. The use of switch 81 is to prevent the energisation of relay 73 and hence the closing of switch 71 during this operation of switch 45, for that would result in the application of a large velocity-error signal to the active actuator 12 with a consequent interference with its precision operation.

The energisation of contacts 2 to 4 has no result other than to confirm existing conditions. The only effective result of the traverse comes from the energisation of contact 5 to close switch 44; for the changeover of contacts P3 has changed the polarity of the reversing potential to positive, which potential, acting on valve 15, drives piston 13 from the LH to the RH end of its travel. With the arrival of this piston at the RH end, switch 23 closes, and as this switch is now connected by switch P1/2 (in its new position) to relay 43 the closing of the switch causes switch 44 to be opened, leaving the idle actuator to take over the drive to the left at the next change.

The P contacts remain in this reversed condition so long as the error signal is negative and so demanding an LH drive; and whilst this is so, it is actuator switches 22 and 29, rather than 23 and 30, that initiate each stepping action of switches 45 and 55.

Various details of the above-described embodiment may be modified within the scope of the invention. There may for example be more than two actuators to be brought into sole driving engagement in turn. The cylinders of the actuators may be secured to the work table, the groove to which the pistons are coupled being in some part of the fixed frame. Where the control signal represents the required position or accleration of the object rather than its velocity, the measuring device 34 will not be of the tachometer kind but some other device responsive to the quantity controlled.

What is claimed is:

1. A servo-controlled drive for imparting to an object a movement relative to a reference structure in dependence on a control signal representing at any given moment the required position, velocity, or acceleration of the object relative to the structure at that moment including at least two actuators each having a piston arranged to traverse a cylinder which is short compared with the range of said movement, for each actuator a clutch for coupling the actuator to drive the object relative to the reference structure, actuator changeover means for bringing the actuators sequentially into sole driving engagement with the object, a measuring device for deriving a measured signal representing at any given moment the actual position, velocity, or acceleration of the object relative to the reference structure at that moment, a comparator for comparing said measured signal with said control signal and deriving an error signal dependent in sense on the sense of the difference between those signals, and actuator control means whereby the position in its cylinder of the piston of the active actuator—that is, the actuator in said driving engagement—is dependent on said error signal.

2. Apparatus as claimed in claim 1 wherein said actuator changeover means includes for each actuator two actuator switches arranged to be respectively operated as the piston of that actuator nears the respective ends of its travel and a relay system controllable by said switches to effect the appropriate operation of the clutches and the application of the error signal.

3. Apparatus as claimed in claim 2 wherein said relay system includes for each actuator a stepping switch including a wiper arranged to traverse a bank of fixed contacts when the piston of the actuator closes the actuator switch near the end of its active travel, relays connected to those contacts so as to be energised by the engagement of the wiper therewith to successively apply the error signal to the on-coming actuator—that is, the next actuator to be rendered active—engage the clutch of the on-coming actuator, thereby rendering that actuator active, disengage the clutch of the off-going actuator, thereby rendering that actuator idle, disconnect the error signal from the idle actuator, and finally transfer the piston of the idle actuator to the other end of its travel.

4. Apparatus as claimed in claim 3 including delay means for delaying the operations subsequent to the application of the error signal to the on-coming actuator until the piston thereof has attained a velocity relative to the reference structure equal to that of the piston of the off-going actuator.

5. Apparatus as claimed in claim 4 wherein said delay means includes means for deriving a velocity-error signal proportional to the velocity of said pistons relative to one another, and means for applying this velocity-error signal to arrest further stepping movement of said wiper until the signal is zero.

6. Apparatus as claimed in claim 5 wherein means are provided for applying the velocity-error signal to accelerate the movement of the piston of the on-coming actuator.

7. Apparatus as claimed in claim 2 for use where the error signal is subject to changes of sign, including changeover devices for reversing the connections from the actuator switches to the relay system, further changeover devices for transferring the piston of each idle actuator to the other end of its cylinder, and means responsive to the error signal for operating said devices when the error signal changes sign.

8. Apparatus as claimed in claim 1 wherein each of said clutches includes a slot in said object or said structure, the slot being of dovetail section, there being within the slot a co-operating member of complementary shape coupled to the actuator and movable towards the open face of the slot for engagement with the slot.

References Cited in the file of this patent

UNITED STATES PATENTS

| | | |
|---|---|---|
| 2,319,125 | Grote | May 11, 1943 |
| 2,398,421 | Frische et al. | Apr. 16, 1946 |
| 2,688,847 | Harness et al. | Sept. 14, 1954 |